United States Patent
Marty et al.

(10) Patent No.: US 8,231,709 B2
(45) Date of Patent: Jul. 31, 2012

(54) METHOD OF SEPARATING A SYNGAS CONTAINING HYDROGEN AND CARBON MONOXIDE BUT ALSO AT LEAST CARBON DIOXIDE AND WATER VAPOR

(75) Inventors: Pascal Marty, Paris (FR); Bernd Polster, Frankfurt am Main (DE)

(73) Assignee: L'Air Liquide Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 531 days.

(21) Appl. No.: 12/374,445

(22) PCT Filed: Aug. 3, 2007

(86) PCT No.: PCT/FR2007/051778
§ 371 (c)(1),
(2), (4) Date: Aug. 31, 2009

(87) PCT Pub. No.: WO2008/017783
PCT Pub. Date: Feb. 14, 2008

(65) Prior Publication Data
US 2010/0147147 A1    Jun. 17, 2010

(30) Foreign Application Priority Data
Aug. 10, 2006 (FR) ...................................... 06 53338

(51) Int. Cl.
*C01B 3/50* (2006.01)
*B01D 53/22* (2006.01)

(52) U.S. Cl. .................. 95/45; 95/96; 96/4; 62/617
(58) Field of Classification Search ................. 95/45, 47, 95/50, 51, 96, 130, 139, 140; 96/4, 108, 96/121; 62/617
See application file for complete search history.

(56) References Cited

U.S. PATENT DOCUMENTS

| 4,778,670 | A | | 10/1988 | Pinto | |
|---|---|---|---|---|---|
| 5,753,010 | A | * | 5/1998 | Sircar et al. | 95/45 |
| 5,897,686 | A | * | 4/1999 | Golden et al. | 95/99 |
| 6,613,125 | B1 | * | 9/2003 | Wallace et al. | 95/55 |
| 6,630,011 | B1 | * | 10/2003 | Baker et al. | 95/47 |
| 2005/0229782 | A1 | * | 10/2005 | Monereau et al. | 95/96 |

FOREIGN PATENT DOCUMENTS

| EP | 0317235 | 5/1989 |
|---|---|---|
| EP | 0341879 | 11/1989 |
| WO | WO2006097703 | 9/2006 |

OTHER PUBLICATIONS

PCT Search Report for PCT/FR2007/051778, Feb. 2008.

* cited by examiner

*Primary Examiner* — Frank Lawrence, Jr.
(74) *Attorney, Agent, or Firm* — Elwood L. Haynes

(57) ABSTRACT

A process for separating a gas mixture in a separation unit of the type in which the gas mixture comes from a reaction unit and comprises, as main constituents, hydrogen ($H_2$) and/or carbon monoxide (CO).

20 Claims, 1 Drawing Sheet

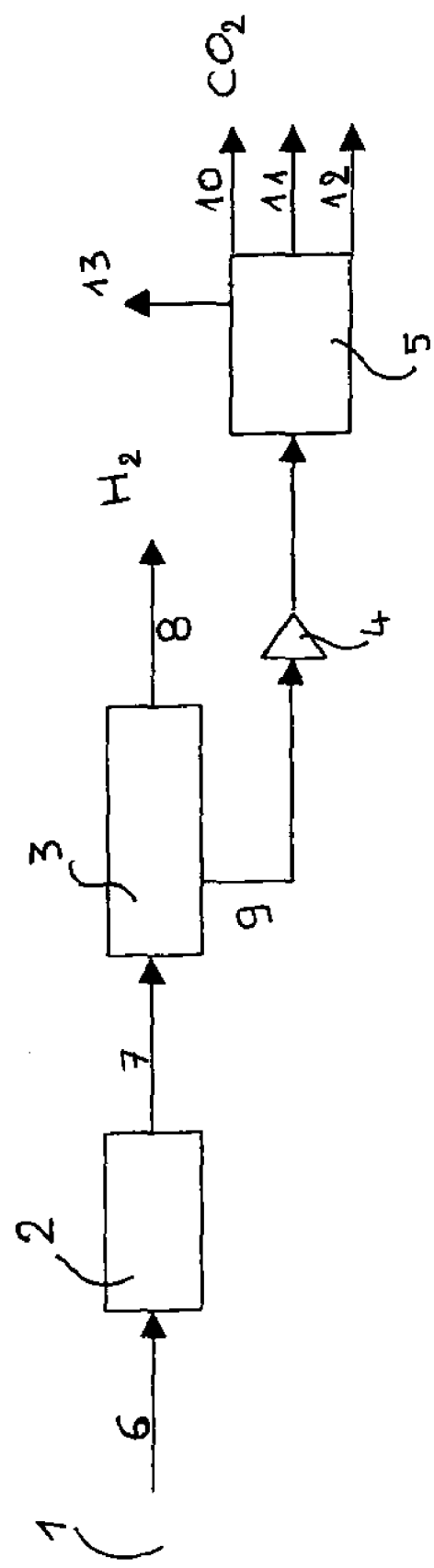

METHOD OF SEPARATING A SYNGAS CONTAINING HYDROGEN AND CARBON MONOXIDE BUT ALSO AT LEAST CARBON DIOXIDE AND WATER VAPOR

This application is a §371 of International PCT Application PCT/FR2007/051778, filed Aug. 3, 2007.

BACKGROUND

1. Field of the Invention

The present invention relates to a process for separating a gas mixture in a separation unit of the type in which the gas mixture comes from a reaction unit and comprises, as main constituents, hydrogen ($H_2$) and/or carbon monoxide (CO).

1. Related Art

Many industries use these gas mixtures which, in addition to CO and $H_2$, in general also contain other constituents, especially carbon dioxide ($CO_2$), methane and water, and also nitrogen and other impurities. Such mixtures constitute synthesis gases, called hereafter syngases, serving for various production processes. They are in fact used as raw material for the production of fluids, for example hydrogen, carbon monoxide, carbon dioxide or $H_2$/CO mixtures in a predetermined ratio for the purpose of various chemical syntheses, especially the synthesis of methanol or of acetic acid, or the synthesis of reducing atmospheres for surface treatments, for metallurgical operations, etc.

These gas mixtures are generally obtained from one or more reaction media, which are themselves fed with gaseous feed fluids. As examples of reaction units treating such reaction media, mention may be made of units for the steam reforming of liquid or gaseous hydrocarbons, for autothermal reforming, for carbon dioxide reforming, for methanol reforming or cracking, or for partial oxidation of gaseous, liquid or solid compounds containing carbon and hydrogen.

Various separation techniques are used to prepare, from a gas mixture of this type feeding a separation step, at a feed pressure $P_0$, one or more required fluid products. What is then obtained after the separation steps is at least two separate streams, at least two separate pressures. One of these streams is in general obtained at what is called a low pressure corresponding to a pressure that may be around $P_0/8$ to $P_0/40$, in such a way that this stream will be frequently compressed in order to be used, especially to utilize all or some of the molecules that it contains; the other stream is obtained at what is called a high pressure, corresponding to the feed pressure reduced by the pressure drops associated with the separation process; however, it is sometimes necessary for it to be compressed in order to use it.

Thus, when separation of a gas mixture of the above type is carried out by pressure swing adsorption (PSA), what is obtained is at least one relatively pure gas called the "PSA product" at a high pressure and a gas or gas mixture called the "PSA offgas" at low pressure. When separation is carried out by permeation through a membrane, some of the molecules pass through the membrane, forming a low-pressure gas stream called "permeate", whereas other molecules, retained by the membrane, constitute the "residue", which is a gas stream available at high pressure. Whatever the mode of separation, each of the two streams I and II contains all the compounds contained in the mixture to be separated, but in very different proportions (including sometimes traces).

When the desire is to use, as product, molecules contained in a "PSA offgas", a "membrane permeate" or another gaseous fluid output at low pressure from a separation step, whether this be hydrogen, carbon monoxide or carbon dioxide for example, it is sometimes necessary:

to compress the gas in question in a compressor;
to separate, cryogenically or by scrubbing, the constituents present, so as to purify at least one type of molecule contained in the fluid in question; and
to associate compression with a cryogenic separation or a scrubbing.

However, the possible combined presence of moisture and carbon dioxide may lead to the well-known phenomenon of carbon acid formation and consequently it may corrode the equipment used.

One known solution to this problem consists in providing equipment made of stainless steel, especially for steps of compressing said low-pressure fluid so that the equipment is protected from acid attack, or providing a step of predrying the gas stream when it has to be separated cryogenically, which is an expensive step as it is applied to a low-pressure stream.

SUMMARY OF THE INVENTION

The object of the present invention is to provide a less expensive solution to this problem, by proposing a separation process of the type described in which the risks associated with the presence of water during the subsequent treatments when using these low-pressure fluids resulting from the separation are eliminated thanks to the water molecules being removed upstream of the steps for generating the low-pressure stream.

For this purpose, the invention consists of a process for separating a gas mixture containing essentially hydrogen and carbon monoxide, but also at least carbon dioxide and water vapor, said process comprising at least the steps of:

a) separation S of the gas mixture at a pressure $P_0$ into at least two streams I and II in which the stream I is a gas stream at a low pressure $P_I$, containing all the compounds contained in the gas mixture to be separated, in variable proportions, and the stream II is a gas stream at a pressure $P_{II}$ called the high pressure, greater than $P_I$, containing all the compounds contained in the gas mixture to be separated, in variable proportions that are different from those of the stream I;

b) use of the high-pressure stream II;

c) use of the low-pressure stream I for at least partial utilization of said stream I, characterized in that, prior to step a) the gas mixture to be separated is subjected to a step of:

$a_0$) drying of the gas mixture containing the water vapor in order to remove the water molecules and obtain a dry mixture.

The term "low pressure" is understood to mean a low pressure obtained conventionally at the output of separation steps—it depends on the mode of separation chosen to carry out this step S. The pressure $P_I$ is thus preferably between 1.1 and 5 bara for a PSA process. It is between $P_0/100$ and $P_0/2$ for a separation process based on permeation.

Likewise, the high pressure $P_{II}$ is a high pressure obtained conventionally at the output of separation steps—it corresponds to the feed pressure reduced by the pressure drops associated with the separation process.

Thus, the stream I is a dry low-pressure stream that can therefore be used without prejudice due to the presence of water molecules, whether it be compressed, directly sent into a cryogenic separation, utilized by a combination of the two, or sent directly into a network.

According to a first variant, the separation step S is a permeation-based separation step with production of at least one permeate I at the pressure $P_I$ and a residue II at the high pressure $P_{II}$.

The product of the separation is set in the permeate. In the case of hydrogen, it is generally obtained at a purity of around 95%. Owing to the relatively high percentage concentration of impurities in the permeate, $CO_2$ and water vapor (when the product to be separated contains some) are found therein. This combined presence of water vapor and $CO_2$ in the product is problematic whenever the product obtained at a low pressure has to be compressed for its external use (additional purification, exportation via a supply network or otherwise). The process of the invention makes it possible here, thanks to the mixture feeding the permeation step being dried, to solve this problem without the use of stainless steel equipment or a step of drying a low-pressure fluid (which would require larger and therefore more expensive driers).

According to a second variant of the invention, the separation step a) is a separation step with a PSA (pressure swing adsorption) production of at least one pure gaseous product II at the high pressure $P_{II}$ and a PSA offgas I to be utilized, obtained at the low pressure $P_I$.

The pressure swing adsorption delivers a very pure product with generally a purity greater than 99.9%. The offgas obtained contains all the products contained in the starting mixture, including the product. Thus, for example, an $H_2$ PSA unit produces very pure hydrogen, but the offgas itself contains a variable proportion of hydrogen, of around 30% or more. Thus, in addition, this offgas is itself also frequently used to provide one or more products, and to do so, owing to its low pressure, it must in general be compressed and/or cryogenically treated and/or scrubbed. In this case too, the process of the invention makes it possible, thanks to the mixture feeding the permeation step being dried, to solve the problem of the presence of water vapor liable to condense, without the use of stainless steel equipment and without a step of drying a low-pressure fluid.

Preferably, the step of using the stream I comprises a step of compressing said stream I in order to obtain a stream at the pressure $P_{III}$ above $P_I$. This compression step can therefore be carried out in a machine whose components in contact with said gas stream I are made of steel called "carbon steel", which is less expensive than stainless steel components.

Preferably too, the step of using the stream I comprises a cryogenic separation step, after the compression step when the latter exists, in order to obtain at least one purified product. The purpose of this step is to separate and purify one type of molecule contained in said stream I. This molecule may for example be carbon dioxide.

The drying step of the invention must be distinguished from a water separation step conventionally present during the treatment of syngases, the purpose of which is to remove the water present in liquid form in the cool syngas. This water separation step delivers a gas stream at its dew point, under the temperature and pressure conditions existing locally, which stream will be subjected to the separation process according to the invention. By removing the water, which is liable to condense during the subsequent steps, contained in the gas mixture prior to the separation step S, dry gases are obtained as output of said separation step S, this being particularly advantageous in the presence of carbon dioxide. The term "dry gas" is understood according to the invention to mean a gas whose water content is low enough to prevent water from condensing during the subsequent steps—it may contain less than 1000 ppm water and more particularly less than 100 ppm water. The drying step according to the invention is carried out upstream of the separation S, i.e. on a gas stream available under pressure (generally from 15 to 100 bar), thereby enabling the size of the driers to be limited.

Depending on the purity or the composition required for the products sought, separation of the gas mixture into at least two streams may be carried out by permeation or by pressure swing adsorption or by a combination of these two methods of separation, in parallel or in series.

Another subject of the invention is an installation for separating a gas mixture essentially containing hydrogen and carbon dioxide, but also at least carbon dioxide and water and possibly methane, nitrogen and other impurities, said installation comprising: a source of the gas mixture to be separated; a separation unit for separating the gas mixture into at least two streams I and II, in which the stream I is a gas stream at a low pressure $P_I$, containing all the compounds contained in the gas mixture to be separated, in variable proportions, and the stream II is a gas stream at a high pressure $P_{II}$, containing all the compounds contained in the gas mixture to be separated, in variable portions that are different to those of the stream I; a module for using the high-pressure stream II; a module for using the low-pressure stream I for at least partial utilization of said stream I, and also lines connecting the separation unit to the module for using the gas stream I and the separation unit to the module for using the gas stream II, characterized in that it further includes: a unit for drying the gas mixture to be separated; and lines connecting the source to the drying unit and the drying unit to the separation unit.

According to preferred installation variants, the separation unit of the above installation comprises a separation unit based on permeation and/or a separation unit based on pressure swing adsorption capable of implementing the processes defined above.

When the installation comprises a compression means for compressing a low-pressure gas stream coming from the separation step and intended to be utilized after being recompressed, this compression is advantageously carried out using one or more carbon steel compressors that are less expensive than compressors whose elements of certain stages in contact with the stream having a risk of carbonic acid formation must be made of stainless steel.

According to another preferred variant, the installation comprises a cryogenic separation unit intended for the treatment of the low-pressure gas stream from the separation unit, if applicable after compression.

An example of how the invention is implemented will now be described with regard to the appended FIG. 1, which is a diagram of an installation for the production of hydrogen coming from a unit for steam reforming of hydrocarbons with purification of the hydrogen in a PSA unit and production of $CO_2$ from the PSA offgas.

BRIEF DESCRIPTION OF THE FIGURES

FIG. 1 illustrates an installation for the production of hydrogen coming from a unit for steam reforming of hydrocarbons with purification of the hydrogen in a PSA unit and production of $CO_2$ from the PSA offgas in accordance with one embodiment of the present invention.

DETAILED DESCRIPTION OF THE INVENTION

The installation shown by way of illustration in FIG. 1 essentially comprises a module 1 for feeding a wet gas mixture, a drying unit 2, a PSA separation unit 3, which produces two gas streams I and II, a compression means 4, intended to compress the gas stream I and a cryogenic unit or cold box 5 for the production of carbon dioxide.

The installation operates in the following manner:

the feed module I (not shown in detail in the figure) typically comprises a reformer which, fed with a light hydrocarbon feedstock, produces a reforming gas or syngas, which predominantly contains hydrogen and CO, substantial quantities of methane, water and $CO_2$, together with nitrogen; this gas is cooled and the condensed water is removed in a condensate separation tank, the gas resulting from the separator constituting the gas mixture 6 containing water vapor to be separated;

the mixture 6 coming from the unit 1 then passes through the drying unit 2, which absorbs the water contained in the stream I in order to produce a dry gas mixture 7;

the dry mixture 7 coming from the unit 2 then passes into the separation unit 3, which operates in the following manner: the unit 3 is a PSA unit which produces the two gas streams I and II. The gas stream II, with the reference 8, delivers hydrogen produced by the installation. The gas stream I, with the reference 9, is the PSA offgas. This contains CO, $CO_2$, methane and nitrogen present in the gas feeding the purification unit 3 and also hydrogen molecules. It is generally obtained at a very low pressure of the order of a few hundred millibars; and the stream 9 is then treated in the cryogenic unit 5 in order to deliver carbon dioxide 10. To do this, the stream 9 is firstly compressed in the compressor 4 and then treated in the cryogenic unit 5 in order to separate and purify the carbon dioxide molecules. The cryogenic unit 5 furthermore delivers pure liquid carbon dioxide 10, hydrogen 11, a gas stream 12 containing methane, hydrogen and carbon monoxide, which will be recycled as a fuel, and also a nitrogen purge 13.

In the above example, the purpose of the process is to produce hydrogen and carbon dioxide.

If it is desired not to produce $CO_2$, the process traditionally provides, after the step of cooling the syngas, a decarbonation step with the purpose of removing most of the $CO_2$ molecules present in the syngas. The drying step according to the invention is then after this decarbonation step. It is then advantageous in the driers to combine two adsorbents: one (for example $Al_2O_3$) for the purpose of removing the water, whereas the second (for example active carbon) has the purpose of removing the residual $CO_2$.

For a further understanding of the nature and objects for the present invention, reference should be made to the detailed description, taken in conjunction with the accompanying drawing, in which like elements are given the same or analogous reference numbers and wherein:

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A process for separating a gas mixture containing essentially hydrogen and carbon monoxide, but also at least carbon dioxide and water vapor, said process comprising the steps of:

a) drying the gas mixture in a drying unit, thereby obtaining a dried gas mixture, wherein the dried gas mixture is substantially dry such that water is prevented from condensing downstream;

b) separating the dried gas mixture, the dried gas mixture having a pressure $P_0$, into at least a first gas stream and a second gas stream, the first gas stream having a pressure $P_I$, the first gas stream containing all the compounds contained in the dry gas mixture in a first proportion, the second gas stream having a pressure $P_{II}$, wherein the pressure $P_{II}$ is greater than the pressure $P_I$, the second gas stream containing all the compounds contained in the dry gas mixture, in a second proportion, wherein the first proportion is different from the second proportion;

c) using the second gas stream; and d) using at least a portion of the first gas stream.

2. The process of claim 1, in which the separation step is a permeation-based separation step with production of at least one permeate at the pressure $P_I$ and a residue at the pressure $P_{II}$.

3. The process of claim 1, in which the separation step b) is a separation step with a pressure swing adsorption production of at least one pure gaseous product at the second pressure and a pressure swing adsorption offgas to be utilized at the pressure $P_I$.

4. The process of claim 1, in which step d) of using the first gas stream comprises a compression step in which the first gas stream is compressed to a pressure $P_{III}$, wherein the pressure $P_{III}$ is greater than the pressure $P_I$.

5. The process of claim 1, in which step d) of using the first gas stream comprises a cryogenic separation step after a), in order to obtain at least one purified product.

6. The process of claim 1, in which the gas mixture to be treated is a syngas.

7. An installation for separating a gas mixture essentially containing hydrogen and carbon monoxide, but also at least carbon dioxide and water, comprising:

a source of the gas mixture to be separated, wherein the gas source is at a pressure $P_0$;

a unit for drying the gas mixture to be separated to form a dried gas mixture, wherein the unit is operable to remove water contained in the gas mixture such that the dried gas mixture is substantially dry such that water is prevented from condensing downstream of the unit;

a separation unit for separating the dried gas mixture into at least a first gas stream and a second gas stream, in which the first gas stream is at a pressure $P_I$, and the first gas stream containing all the compounds contained in the gas mixture, in a first proportion, and the second gas stream is at a pressure $P_{II}$, the second gas stream containing all the compounds contained in the gas mixture, in a second proportion, wherein the first proportion is different from the second proportion;

lines connecting the source to the drying unit and lines connecting the drying unit to the separation unit;

a first module for using at least a portion of the first gas a second module for using the second gas stream, and lines connecting the separation unit to the first module and lines connecting the separation unit to the second module.

8. The installation of claim 7, wherein the separation unit comprises a separation unit based on permeation or a separation unit based on pressure swing adsorption, or a combination of the two.

9. The installation of claim 7, further comprising a carbon steel compression device.

10. The installation of claim 7, further comprising a cryogenic separation unit.

11. The process of claim 4, wherein the compression step is conducted with a compression device having a plurality of components in fluid contact with the first gas stream, wherein the components in fluid contact with the first gas stream are made of carbon steel.

12. The process of claim 1, wherein the gas mixture comprises more than 1000 ppm water.

13. The process of claim 1, wherein the dried gas mixture is substantially dry such that water is prevented from condensing during steps b), c), or d).

14. The process of claim 1, wherein the dried gas mixture comprises less than 1000 ppm water.

15. The process of claim 1, wherein the dried gas mixture comprises less than 100 ppm water.

16. The process of claim 1, wherein the dried gas mixture has a clew point temperature substantially lower than the temperature in the drying unit.

17. A process for separating a gas mixture containing essentially hydrogen and carbon monoxide, but also at least carbon dioxide and water vapor, said process comprising the steps of:
   a) drying the gas mixture in a drying unit to form a dried gas mixture, the drying unit comprising an adsorbent operable to remove water vapor from the gas mixture such that the dried gas mixture is substantially dry; and
   b) separating the dried gas mixture, the dried gas mixture having a pressure $P_0$, into at least a first gas stream and a second gas stream, the first gas stream having a pressure $P_I$, the first gas stream containing all the compounds contained in the dry gas mixture in a first proportion, the second gas stream having a pressure $P_{II}$, wherein the pressure $P_{II}$ is greater than the pressure $P_I$, the second gas stream containing all the compounds contained in the dry gas mixture, in a second proportion, wherein the first proportion is different from the second proportion.

18. The process of claim 17, wherein the adsorbent comprises $Al_2O_3$.

19. The process of claim 17, wherein the drying unit further comprises a second adsorbent operable to remove $CO_2$.

20. The process of claim 18, wherein the second adsorbent comprises active carbon.

* * * * *

UNITED STATES PATENT AND TRADEMARK OFFICE
CERTIFICATE OF CORRECTION

PATENT NO. : 8,231,709 B2  
APPLICATION NO. : 12/374445  
DATED : July 31, 2012  
INVENTOR(S) : P. Marty et al.

Page 1 of 1

It is certified that error appears in the above-identified patent and that said Letters Patent is hereby corrected as shown below:

In Column 6, line 27, replace the words "step after a)" with the words --step after step a)--.

In Column 7, line 14, replace the words "clew point" with the words --dew point--.

Signed and Sealed this  
Twenty-fifth Day of September, 2012

David J. Kappos  
*Director of the United States Patent and Trademark Office*